(12) United States Patent
Huang

(10) Patent No.: US 7,775,671 B2
(45) Date of Patent: Aug. 17, 2010

(54) LENS CAP SET AND A LENS DEVICE UTILIZING THE SAME

(75) Inventor: Tzu-Tse Huang, Hsinchu (TW)

(73) Assignee: Coretronic Corporation (TW)

( * ) Notice: Subject to any disclaimer, the term of this patent is extended or adjusted under 35 U.S.C. 154(b) by 300 days.

(21) Appl. No.: 11/843,378

(22) Filed: Aug. 22, 2007

(65) Prior Publication Data

US 2008/0094708 A1    Apr. 24, 2008

(30) Foreign Application Priority Data

Oct. 20, 2006    (TW) .............................. 95138737 A

(51) Int. Cl.
  *G02B 23/16*    (2006.01)
  *G02B 11/04*    (2006.01)
(52) U.S. Cl. ..................................... 359/511
(58) Field of Classification Search ................ 359/511, 359/819; 396/448
  See application file for complete search history.

(56) References Cited

U.S. PATENT DOCUMENTS 2,953,970 A  *  9/1960  Maynard .................... 359/611
3,682,055 A  *  8/1972  Okano et al. ................ 396/316
5,208,624 A  *  5/1993  MacKay ...................... 396/544
6,889,006 B2 *  5/2005  Kobayashi .................... 396/6
2005/0169628 A1 *  8/2005  Zhang ........................ 396/529

FOREIGN PATENT DOCUMENTS

| CN | 1479158 | 3/2004 |
|---|---|---|
| JP | 2006-18144 | 1/2006 |
| TW | 543790 | 7/2003 |
| TW | I232346 | 5/2005 |
| TW | M265649 | 5/2005 |

OTHER PUBLICATIONS

Search Report mailed Apr. 1, 2009 in corresponding Taiwan Application No. 095138737.

* cited by examiner

*Primary Examiner*—Alessandro Amari
(74) *Attorney, Agent, or Firm*—Ostrolenk Faber LLP

(57) ABSTRACT

A lens cap set for covering an opening defined by a peripheral edge of a lens assembly includes a mounting seat adapted to be disposed on the peripheral edge of the lens assembly, and a lens cap. At least a portion of one of the mounting seat and the lens cap is made from a magnetically attractable material, and at least a portion of the other one of the mounting seat and the lens cap is made from a magnetic material. The lens cap is coupled magnetically and removably to the mounting seat for covering the opening defined by the peripheral edge of the lens assembly.

18 Claims, 4 Drawing Sheets

LENS CAP SET AND A LENS DEVICE UTILIZING THE SAME

CROSS-REFERENCE TO RELATED APPLICATION

This application claims priority of Taiwanese Application No. 095138737, filed on Oct. 20, 2006.

BACKGROUND OF THE INVENTION

1. Field of the Invention

The invention relates to a lens cap set and a lens device utilizing the same, more particularly to a magnetic lens cap set and a lens device utilizing the magnetic lens cap set.

2. Description of the Related Art

In order to prevent a lens assembly of a projector from getting stained or scratched, a lens cap is usually provided to cover the lens assembly in order to provide protection to the lens assembly when the projector is not in use.

As shown in FIG. 1, a conventional lens cap set includes a lens cap 11 that is provided with two hook members 111 respectively having springs (not shown) embedded therein and being respectively disposed at opposite sides of the lens cap 11, and a mounting ring (not shown) that is adapted to be fixed to a housing of a projector or a lens assembly of the projector and that defines a light path in spatial communication with an opening of the lens assembly. The lens cap 11 is disposed onto the mounting ring by exerting an inward force on the hook members 111 so as to press the springs and move the hook members 111 toward each other. When forces exerted on the coupling members 111 are released, the springs included in the lens cap 11 rebound the hook members 111 outwardly by virtue of resilience such that the hook members 111 engage the mounting ring, thereby fixing the lens cap 11 to the mounting ring. Consequently, the opening of the lens assembly is covered by the lens cap 11.

As shown in FIG. 2, another lens cap 12 can be included in the conventional lens cap set. The lens cap 12 includes an iron member 122 and a rubber member 121 surrounding the iron member 122. The iron member 122 is provided to prevent the rubber member 121 from deformation due to illumination by light beams. Since the rubber member 121 has elasticity, the lens cap 12 can fit tightly onto the mounting ring so as to cover the opening of the lens assembly.

However, since the lens caps 11, 12 employed in the conventional lens cap set need to be matched with the mounting ring during use, the lens cap 11, 12 and the mounting ring must correspond to each other in size and shape. As a result, manufacturing tolerances of the lens caps 11, 12 and the mounting ring need to be taken into consideration, where lens caps 11, 12 beyond the manufacturing tolerances may not be able to fit onto the mounting ring. In addition, the springs of the lens cap 11 and the rubber member 121 of the lens cap 12 are both subject to elasticity fatigue after long periods of use, and the rubber member 121 is even vulnerable to hardening. Consequently, the lens caps 11, 12 can only be used for a limited period of time.

SUMMARY OF THE INVENTION

Therefore, the object of the present invention is to provide a lens cap set that allows for greater manufacturing tolerances for assembling components, that has a relatively longer service life, and that is convenient to use as compared to the prior art.

Another object of the present invention is to provide a lens device utilizing a lens cap set that allows for greater manufacturing tolerances among assembling components, that has a relatively long service life, and that is convenient to use as compared to the prior art.

According to one aspect of the present invention, a lens cap set is provided for covering an opening defined by a peripheral edge of a lens assembly. The lens cap set includes a mounting seat adapted to be disposed on the peripheral edge of the lens assembly, and a lens cap. At least a portion of one of the mounting seat and the lens cap is made from a magnetically attractable material, and at least a portion of the other one of the mounting seat and the lens cap is made from a magnetic material. The lens cap is coupled magnetically and removably to the mounting seat for covering the opening defined by the peripheral edge of the lens assembly.

According to another aspect of the present invention, a lens device is provided and includes a lens assembly and a lens cap set. The lens assembly includes a lens body that has a peripheral edge defining an opening. The lens cap set includes a mounting seat that is disposed on the peripheral edge of the lens body, and a lens cap. At least a portion of one of the mounting seat and the lens cap is made from a magnetically attractable material. At least a portion of the other one of the mounting seat and the lens cap is made from a magnetic material. The lens cap is coupled magnetically and removably to the mounting seat for covering the opening defined by the peripheral edge of the lens body.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
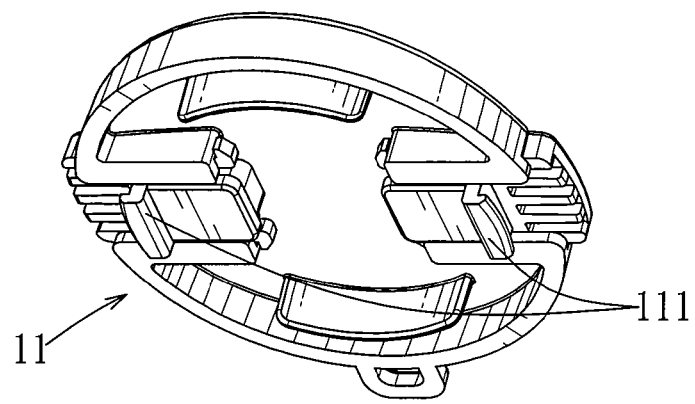
FIG. 1 is a three-dimensional view of a lens cap for a conventional lens cap set.
Figure 2:
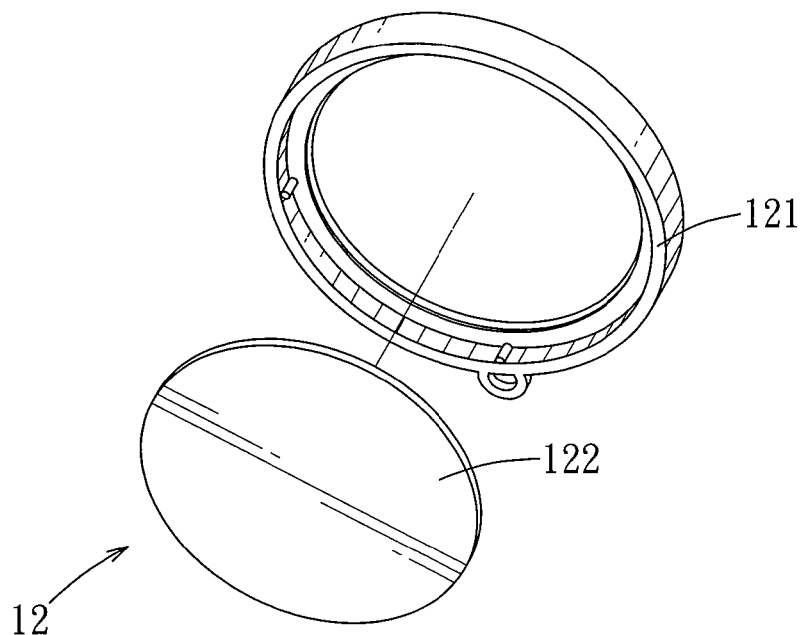
FIG. 2 is an exploded three-dimensional view of another lens cap for the conventional lens cap set.

In the following detailed description of the preferred embodiments, reference is made to the accompanying drawings which form a part hereof, and in which is shown by way of illustration specific embodiments in which the invention may be practiced. In this regard, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless limited otherwise, the terms "coupled," and "mounted" and variations thereof herein are used broadly and encompass direct and indirect couplings, and mountings. Similarly, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Before the present invention is described in greater detail, it should be noted herein that like elements are denoted by the same reference numerals throughout the disclosure.

Figure 3:
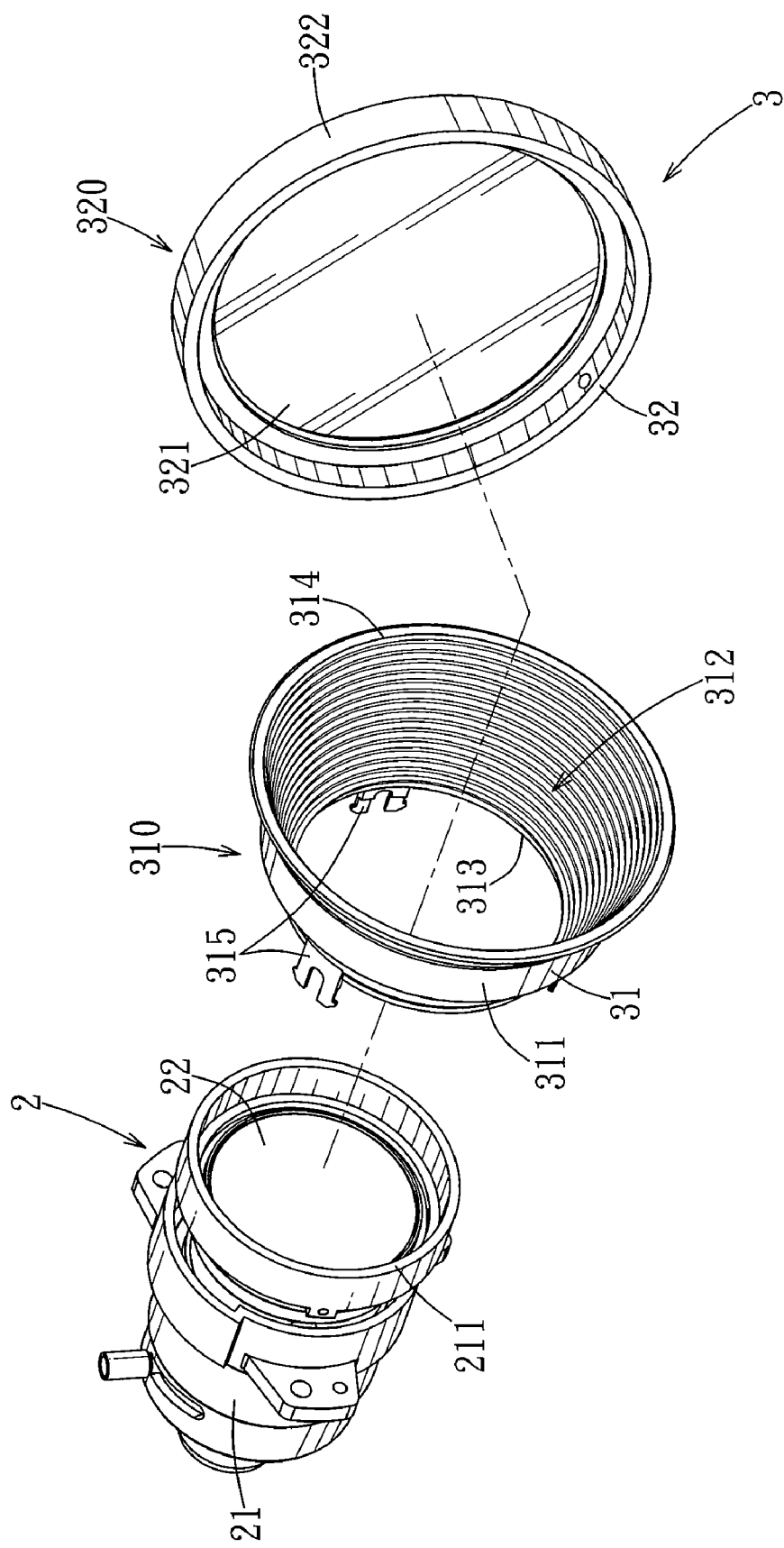
FIG. 3 is an exploded three-dimensional view showing a lens device including a lens cap set according to the first preferred embodiment of the present invention.

As shown in FIG. 3, a lens device according to the first preferred embodiment of the present invention includes a lens assembly 2 and a lens cap set 3.

The lens assembly 2 includes a lens body 21 that has a peripheral edge 211 defining an opening 22.

The lens cap set 3 includes a mounting seat 310 that is disposed on the peripheral edge 211 of the lens body 21, and a lens cap 320. At least a portion of one of the mounting seat 310 and the lens cap 320 is made from a magnetically attractable material, and at least a portion of the other one of the mounting seat 310 and the lens cap 320 is made from a magnetic material. The magnetic material can produce a magnetic field of their own and exert attractive forces on the magnetically attractable material. The magnetic material may be, for example, permanent magnets (e.g., refrigerator magnets or plastic magnets, such as PANiCNQ) or impermanent magnets (e.g., electromagnets). The magnetically attractable material may be, for example, nickel, cobalt, iron, or mineral magnetite. Accordingly, the lens cap 320 is coupled magnetically and removably to the mounting seat 310 for covering the opening 22 defined by the peripheral edge 211 of the lens body 21. In this embodiment, the magnetically attractable material is iron. The mounting seat 310 includes a seat body 31 that is disposed on the peripheral edge 211 of the lens body 21. The lens cap 320 includes a cap body 32. At least a portion of one of the seat body 31 and the cap body 32 is made from the magnetically attractable material, e.g., iron, and at least a portion of the other one of the seat body 31 and the cap body 32 are made from the magnetic material. In this embodiment, the cap body 32 is made from iron, while the seat body 31 is made from the magnetic material. Therefore, the cap body 32 and the seat body 31 are magnetically attracted to each other such that the lens cap 320 is removably and magnetically attached to the mounting seat 310. In this embodiment, the magnetic mounting seat 310 can be formed by injection molding a plastic material that is blended with magnetic particles, or can be formed directly from a magnetic material. Moreover, it is also feasible for the seat body 31 to be made entirely from the magnetically attractable material, and for the cap body 32 to be made entirely from the magnetic material in order for the lens cap 320 to be attached to the mounting seat 310 magnetically and removably.

The seat body 31 includes a surrounding wall 311 that has a light incident side 313 disposed on the peripheral edge 211 of the lens body 21, and a light exit side 314 opposite to the light incident side 313. The surrounding wall 311 defines a light path 312 that is in spatial communication with the opening 22 when the light incident side 313 is disposed on the peripheral edge 211 of the lens body 21.

In this embodiment, the seat body 31 further includes a plurality of coupling parts 315 extending from the surrounding wall 311 adjacent to the light incident side 313 for coupling the seat body 31 to the peripheral edge 211 of the lens body 21. However, the seat body 31 can also be coupled to the lens assembly 2 by providing the seat body 31 with a first threaded portion that is adjacent to the light incident side 313 and that engages threadedly a second threaded portion provided on the lens body 21 adjacent to the peripheral edge 211 in other embodiments of the present invention. In addition, in this embodiment, diameter of the light path 312 gradually increases from the light incident side 313 to the light exit side 314. Nevertheless, the diameter of the light path 312 can also be constant throughout. Furthermore, the seat body 31 is a singular annular body in this embodiment, but can be composed of a plurality of blocks that are spaced apart from each other and that are disposed around the peripheral edge 211 of the lens body 21.

The cap body 32 includes a circular plate 321, and a peripheral wall 322 that extends perpendicularly from a periphery of the circular plate 321. The circular plate 321 has a size and a shape sufficient for covering the light exit side 314 of the surrounding wall 311 of the seat body 31. The peripheral wall 322 has an inner periphery that has a shape and a size corresponding to an outer periphery of the light exit side 314 of the surrounding wall 311. The cap body 32 is attached magnetically to the seat body 31 at the light incident side 314 so as to cover the light path 312 and the opening 22 defined by the peripheral edge 211 of the lens body 21.

When the present invention is applied to a projector, the mounting seat 310 that is fixed to the lens assembly 2 can be disposed in a housing of the projector. The housing of the projector is provided with a hole that is in spatial communication with the opening 22 defined by the peripheral edge 211 of the lens body 21 and the light path 312 defined by the surrounding wall 311 of the seat body 31.

Figure 4:
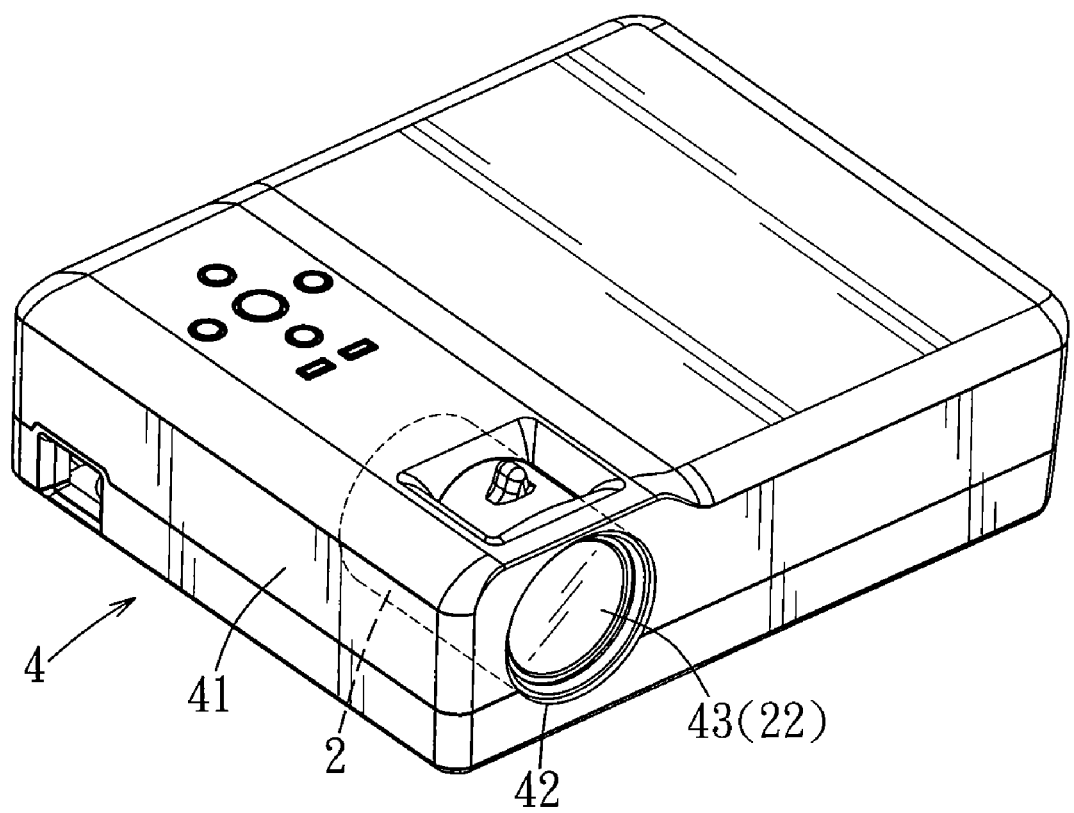
FIG. 4 is a three-dimensional view of a projector to which the lens cap set according to the first preferred embodiment of present invention is mounted.

FIG. 4 illustrates an exemplary application and is a three-dimensional view of a projector 4 to which the lens cap set according to the first preferred embodiment of present invention is mounted. The mounting seat 310 of the lens cap set can be formed integrally with a housing 41 of the projector 4. In particular, the housing 41 is formed with a hole 43 defined by a surrounding edge 42. The hole 43 is in spatial communication with the opening 22 of the lens assembly 2 disposed in the housing 41. The seat body 31 of the mounting seat 310 can be formed by extending directly and integrally from the surrounding edge 42 of the housing 41. Accordingly, the coupling parts 315 can be omitted from the mounting seat 310. Alternatively, the surrounding wall 311 of the seat body 31 can be sleeved on the surrounding edge 42 of the housing 41.

Figure 5:
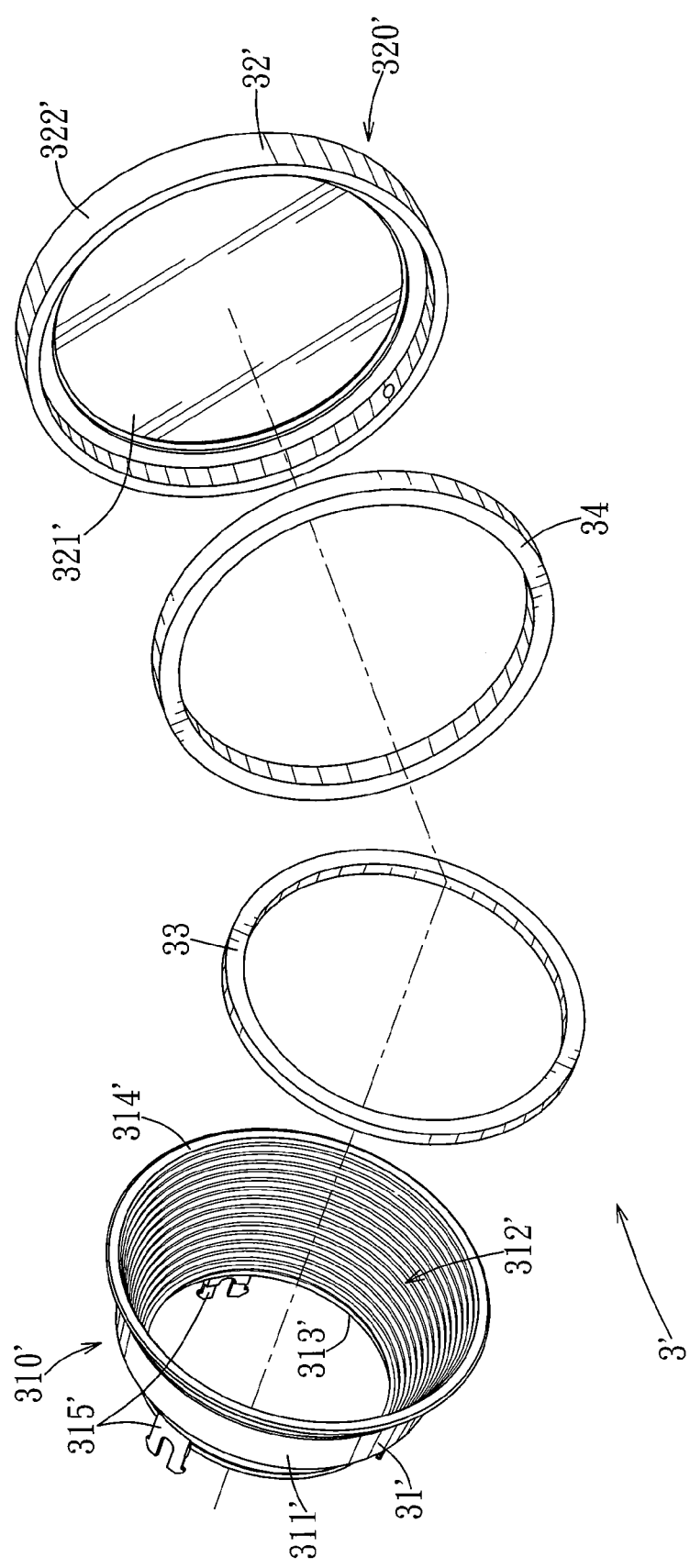
FIG. 5 is an exploded three-dimensional view showing a lens device including a lens cap set according to the second preferred embodiment of the present invention.

As shown in FIG. 3 and FIG. 5, a lens device according to the second preferred embodiment of the present invention differs from a lens device according to the first preferred embodiment of the present invention in that the mounting seat 310' further includes at least one first attaching member 33, and the lens cap 320' further includes at least one second attaching member 34 fixed to the cap body 32'. One of the first and second attaching members 33, 34 is made from the magnetically attractable material, while the other one of the first and second attaching members 33, 34 is made from the magnetic material. For example, when the first attaching member 33 is made from iron, the second attaching member 34 is made from the magnetic material. On the other hand, when the second attaching member 34 is made from iron, the first attaching member 33 is made from the magnetic material.

The lens cap set 3' according to the second preferred embodiment includes a mounting seat 310' and a lens cap 320'. The mounting seat 310' includes a seat body 31', and at least one first attaching member 33 fixed to the seat body 31'. The lens cap 320' includes a cap body 32' and at least one second attaching member 34 fixed to the cap body 32'. In this embodiment, the seat body 31' and the cap body 32' are made from plastic, but are not limited thereto.

The seat body 31' includes a surrounding wall 311' that has a light incident side 313' disposed on the peripheral edge 211 of the lens body 21 (refer to FIG. 3), and a light exit side 314' opposite to the light incident side 313'. The surrounding wall 311' defines a light path 312' that is in spatial communication with the opening 22 when the light incident side 313' is disposed on the peripheral edge 211 of the lens body 21.

In this embodiment, the seat body 31' further includes a plurality of coupling parts 315' extending from the surrounding wall 311' at the light incident side 313' for coupling the seat body 31' to the peripheral edge 211 of the lens body 21. In addition, diameter of the light path 312' gradually increase from the light incident side 313' to the light exit side 314'. Nevertheless, the diameter of the light path 312 can also be constant throughout.

The cap body 32' includes a circular plate 321', and a peripheral wall 322' that extends perpendicularly from a periphery of the circular plate 321'. The circular plate 321' has a size and a shape sufficient for covering the light exit side 314' of the surrounding wall 311' of the seat body 31'. The peripheral wall 322' has an inner periphery that has a shape and a size corresponding to an outer periphery of the light exit side 314' of the surrounding wall 311'.

In this embodiment, the first attaching member 33 is an annular ring that is fixed to the surrounding wall 311' of the seat body 31', and the second attaching member 34 is also an annular ring that is fixed to the peripheral wall 322' of the cap body 32'. The first and second attaching members 33, 34 correspond to each other in size and shape. Since one of the first and second attaching members 33, 34 is made from iron, while the other one is made from the magnetic material, the first and second attaching members 33, 34 are coupled magnetically and removably to each other so as to cover the light path 312' and the opening 22 (refer to FIG. 3) defined respectively by the surrounding wall 311' of the seat body 31' and the peripheral edge 211 of the lens body 21.

In sum, by virtue of magnetic attraction between a magnetically attractable material and a magnetic material, the lens cap 320, 320' and the mounting seat 310, 310' of the lens cap set 3, 3' according to the first and second preferred embodiments of the present invention are capable of coupling to each other magnetically, where at least one portion of one of the lens cap 320, 320' and the mounting seat 310, 310' is made from a magnetically attractable material, while at least one portion of the other one of the lens cap 320, 320' and the mounting seat 310, 310' is made from a magnetic material. Through coupling between the mounting seat 310, 310' and the lens cap 320, 320', the opening 22 defined by the peripheral edge 211 of the lens body 21 of the lens assembly 2, as well as the hole 43 defined by the surrounding edge 42 of the housing 41 of the projector 4 (refer to FIG. 4), is covered. Therefore, not only is the present invention convenient to use, but during manufacturing, greater tolerances are allowed for the cap body 32, 32' and the seat body 31, 31' without encountering the fitting problems experienced in the prior art. Furthermore, since the lens cap 320, 320' and the mounting seat 310, 310' are not coupled fittingly to each other, deformations of these components do not affect the use of the lens cap set 3, 3'. Consequently, the service life of the lens cap set 3, 3' is prolonged, and the objects of the present invention are achieved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens cap set for covering an opening defined by a peripheral edge of a lens assembly, the lens cap set comprising:

a mounting seat configured to be disposed on the peripheral edge of the lens assembly, the mounting seat comprising a seat body, the seat body including a surrounding wall having a light incident side configured to be disposed on the peripheral edge of the lens assembly, and the surrounding wall having a light exit side opposite to the light incident side, the surrounding wall defining a light path that is in spatial communication with the opening when the light incident side is disposed on the peripheral edge of the lens assembly; and a lens cap having a cap body, the cap body including a circular plate having a periphery, and a peripheral wall that extends peripheral from the periphery of the circular plate;

wherein at least a portion of one of the mounting seat and the lens cap is comprised of magnetically attractable material, and at least a portion of the other one of the mounting seat and the lens cap is comprised of magnetic material, the lens cap being coupled magnetically to the mounting seat for covering the opening defined by the peripheral edge of the lens assembly, and the lens cap being removable from the mounting seat at least a portion of one of the cap body and the seat body is comprised of the magnetically attractable material, and at least a portion of the other one of the cap body and the seat body is comprised of the magnetic material.

2. The lens cap set as claimed in claim 1, wherein:
the circular plate of the cap body has a size and a shape sufficient for covering the light exit side, and
the peripheral wall includes an inner periphery having a shape and a size corresponding to an outer periphery of the light exit side of the surrounding wall.

3. The lens cap set as claimed in claim 2, wherein the seat body further includes at least one coupling part extending from the surrounding wall at the light incident side, and configured for coupling the seat body to the peripheral edge of the lens assembly.

4. The lens cap set as claimed in claim 3, wherein one of the cap body and the seat body is made entirely from the magnetically attractable material, and the other one of the cap body and the seat body is made entirely from the magnetic material.

5. The lens cap set as claimed in claim 1, wherein the magnetically attractable material is selected from the group consisting of nickel, cobalt, iron, and mineral magnetite, and the magnetic material is one of a permanent magnet and an impermanent magnet.

6. The lens cap set as claimed in claim 1, further comprising
at least one first attaching member fixed to the seat body of the mounting seat; and
at least one second attaching member fixed to the cap body of the lens cap, one of the first and second attaching members being comprised of the magnetically attractable material, the other one of the first and second attaching members being comprised of the magnetic material, the first and second attaching members being coupled magnetically to each other for covering the opening defined by the peripheral edge of the lens assembly and also being removable from one another.

7. The lens cap set as claimed in claim 6, wherein each of the seat body and the cap body is comprised of plastic.

8. The lens cap set as claimed in claim 6, wherein the first and second attaching members correspond to each other in size and shape.

9. The lens cap set as claimed in claim 6, wherein:
the first attaching member is a first annular ring that is fixed to the surrounding wall of the seat body; and
the second attaching member is a second annular ring that is fixed to the peripheral wall of the cap body.

10. A lens device comprising:
a lens assembly including a lens body that has a peripheral edge defining an opening; and
a lens cap set including
a mounting seat that is configured to be disposed on the peripheral edge of the lens body, the mounting seat comprising a seat body, the seat body including a surrounding wall having a light incident side configured to be disposed on the peripheral edge of the lens body, and the surrounding wall having a light exit side opposite to the light incident side, the surrounding wall defining a light path that is in spatial communication with the opening when the light incident side is disposed on the peripheral edge of the lens body, and
a lens cap having a cap body, the cap body including a circular plate having a periphery and a peripheral wall that extends perpendicularly from the periphery of the circular plate;
wherein at least a portion of one of the mounting seat and the lens cap is comprised of a magnetically attractable material, at least a portion of the other one of the mounting seat and the lens cap being comprised of a magnetic material, the lens cap being coupled magnetically to the mounting seat for covering the opening defined by the peripheral edge of the lens body, and the lens cap being removable from the mounting seat at least a portion of one of the cap body and the seat body is comprised of the magnetically attractable material, and at least a portion of the other one of the cap body and the seat body is comprised of the magnetic material.

11. The lens device as claimed in claim 10, wherein:
the circular plate of the cap body has a size and a shape sufficient for covering the light exit side, and
the peripheral wall includes an inner periphery that has a shape and a size corresponding to an outer periphery of the light exit side of the surrounding wall.

12. The lens device as claimed in claim 11, wherein the seat body further includes at least one coupling part extending from the surrounding wall at the light incident side for coupling the seat body to the peripheral edge of the lens body.

13. The lens device as claimed in claim 12, wherein one of the cap body and the seat body is made entirely from the magnetically attractable material, and the other one of the cap body and the seat body is made entirely from the magnetic material.

14. The lens device as claimed in claim 10, wherein the magnetically attractable material is selected from the group consisting of nickel, cobalt, iron, and mineral magnetite, and the magnetic material is one of a permanent magnet and an impermanent magnet.

15. The lens device as claimed in claim 10, further comprising
at least one first attaching member fixed to the seat body of the mounting seat, and
at least one second attaching member fixed to the cap body of the lens cap, one of the first and second attaching members being comprised of the magnetically attractable material, the other one of the first and second attaching members being comprised of the magnetic material, the first and second attaching members being coupled magnetically to each other for covering the opening defined by the peripheral edge of the lens body and also being removable from one another.

16. The lens device as claimed in claim 15, wherein each of the seat body and the cap body is made from plastic.

17. The lens device as claimed in claim 15, wherein the first and second attaching members correspond to each other in size and shape.

18. The lens device as claimed in claim 15, wherein:
the first attaching member is a first annular ring that is fixed to the surrounding wall of the seat body; and
the second attaching member is a second annular ring that is fixed to the peripheral wall of the cap body.

* * * * *